United States Patent Office 2,702,293
Patented Feb. 15, 1955

2,702,293

THIOKETOPIPERIDINE COMPOUNDS

Karl Hoffmann, Binningen, and Eugen Tagmann, Basel, Switzerland, assignors to Ciba Pharmaceutical Products, Inc., Summit, N. J.

No Drawing. Application April 21, 1952,
Serial No. 283,493

Claims priority, application Switzerland April 28, 1951

8 Claims. (Cl. 260—293.4)

The present invention relates to thioketopiperidine compounds of the formula

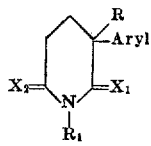

wherein one of the substituents $X_1$ and $X_2$ stands for sulphur and the other for oxygen or sulphur; Aryl is e. g. a phenyl or naphthyl residue which can also be substituted, for example by alkyl groups, substituted hydroxyl or amino groups or halogen atoms; R stands for an aryl or an alkyl residue, such as methyl or ethyl or an aminoalkyl group, especially a dialkylamino or alkylene-imino group, such as a piperidinoalkyl or morpholinoalkyl group; and $R_1$ stands for hydrogen or an alkyl group, such as methyl, ethyl or propyl.

The new compounds can be used as intermediate products, for example for the preparation of the corresponding tetrahydropyridine compounds

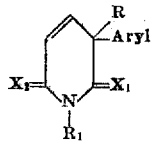

(described and claimed in copending application, Ser. No. 283,494, filed on even date herewith) which are therapeutically useful because of their anticonvulsive and parasympathicolytic properties. The conversion into the aforesaid tetrahydropyridine compounds can be effected according to the said copending application by introducing into one of the positions 4 and 5 of the new piperidines a substituent, such as a halogen atom, which can be split off together with a hydrogen atom in the other of the said positions, and splitting off hydrogen halide from the thus-produced 4- or 5-halogenpiperidine. Moreover, some of them have themselves valuable pharmacological properties, e. g. anticonvulsive or parasympathicolytic effects, and can be used as medicaments.

The new thioketopiperidine compounds are obtained by converting functional thioderivatives of 2-aryl-pentane-1,5-diacids substituted in 2-position by an aryl, alkyl or aminoalkyl residue, into their cyclic thioimides, which are unsubstituted or alkylated at the ring nitrogen atom. For this purpose, the pentane-diacid-mono- or di-thioamides or functional derivatives thereof may be intramolecularly acylated. Thus, the thioamides as aforesaid may be treated with condensing agents, such as concentrated sulphuric acid, acetic anhydride, tin tetrachloride, or titanium tetrachloride, and furthermore boron trifluoride etherates, zinc chloride, aluminium chloride or mixtures of these substances. The new compounds can also be obtained by reacting the functional thio derivatives of pentade diacids with ammonia or monoalkylamines.

A further form of the process consists in replacing by sulphur at least one oxygen atom of a correspondingly 3-substituted 3-aryl-2,6-dioxo-piperidine. Thus, for example, phosphorus penta-sulphide may be caused to act on the said dioxopiperidines at a raised temperature in the presence or absence of a solvent. The compounds used as starting materials can be made by methods in themselves known.

When thioketopiperidines are obtained in accordance with the present process, which contain a basic group, salts thereof with inorganic or organic acids can be made, for example, with a hydrohalic acid, sulphuric acid, phosphoric acid, acetic acid, oxalic acid, citric acid, methane sulphonic acid, benzoic acid, para-aminosalicylic acid or toluene sulphonic acid. The quaternary derivatives of the aforesaid piperidine compounds containing a basic group can also be made. Thus, they may be reacted with reactive esters of alcohols, especially those of hydrohalic acids, sulphuric acid or organic sulphonic acids, for example, alkyl halides, dialkyl sulphates or toluene sulphonic acid esters.

The following examples illustrate the invention, the parts being by weight unless otherwise stated and the relationship of parts by weight to parts by volume being the same as that of the gram to the cubic centimetre:

Example 1

1.5 parts of 2:2-diphenylpentane diacid-1-monothioamide-5-monoamide are dissolved in 15 parts by volume of glacial acetic acid and 0.5 part by volume of sulphuric acid is added in portions at a reaction temperature of 70° C. The temperature of the reaction mixture rises to 90–100° C. When the exothermic reaction has subsided the whole is maintained at a temperature of 100–105° C. for a short time longer. The reaction mixture is poured on to a mixture of ice and water. The resulting 3:3-diphenyl-2-thioketo-6-oxopiperidine has the formula

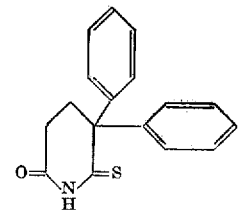

and crystallises out. It is separated by filtration and recrystallised from ethyl alcohol. The lemon yellow needles melt at 165–167° C.

From the 3:3-diphenyl-2-thioketo-6-oxopiperidine the 3:3-diphenyl-2:6-dithioketo-piperidine can be obtained by reaction with phosphorus pentasulphide in the presence of e. g. pyridine as solvent at a raised temperature.

The 2:2 - diphenyl - pentane-diacid-1-monothioamide-5-monoamide used as starting material in this example can be prepared for example as follows:

10.0 parts of 2:2-diphenyl-pentane-diacid-5-monomethyl ester-1-mononitrile, dissolved in 20 parts by volume of absolute alcohol, are mixed with 80 parts by volume of absolute alcohol saturated with ammonia gas, and the whole is saturated with hydrogen sulphide gas in the cold. The reaction mixture is allowed to stand in a closed vessel for 24 hours at room temperature, and is finally heated for 12 hours at 40–50° C. The alcohol is removed by evaporation, the residue is dissolved in ethyl acetate, and the ethyl acetate solution is washed with water, dried over calcium chloride and evaporated. The crystalline residue melts at 171–173° C. with the evolution of gas, after recrystallisation from a mixture of ethyl acetate and ligroin.

Example 2

13.25 parts of 3:3-diphenyl-2:6-dioxo-piperidine are intimately mixed with 13.8 parts of phosphorus pentasulphide, and heated for a short time at 150° C. while stirring well. After cooling, the reaction mixture is taken up in ethyl acetate, and the ethyl acetate solution is washed, dried over calcium chloride and evaporated.

The residue, consisting of 3:3-diphenyl-2-oxo-6-thioketo-piperidine of the formula

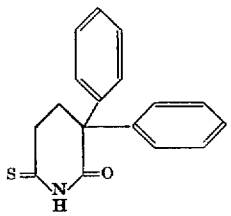

melts at 159–162° C. after recrystallisation from a mixture of ethyl acetate and ligroin.

Example 3

20 parts of 3-phenyl-3-ethyl-2:6-dioxo-piperidine are refluxed for two hours while stirring well with 120 parts by volume of absolute pyridine and 20 parts of finely pulverized phosphorus pentasulphide, and the hot reaction mixture then poured into 1000 parts by volume of hot water. After cooling the whole is exhaustively extracted with ethyl acetate, the ethyl acetate extract washed with dilute sodium carbonate solution, dilute hydrochloric acid and finally with water, then dried over calcium chloride and the solvent evaporated. The residue, consisting of 3-phenyl-3-ethyl-2-oxo-6-thioketo-piperidine of the formula

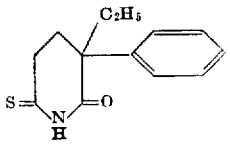

is distilled in a high vacuum and passes over at 159–162° C. under 0.12 mm. pressure. On standing, this compound crystallises and when recrystallised from ethyl acetate with an addition of ligroin shows a melting point of 73–75° C.

Example 4

20 parts of 3-phenyl-3-($\beta$-diethylamino-ethyl)-2:6-dioxo-piperidine are refluxed for 1 hour while being well stirred with 100 parts by volume of dry pyridine and 20 parts of phosphorus pentasulphide. The hot reaction mixture is poured into 1000 parts by volume of hot water and the whole exhaustively extracted with ethyl acetate after cooling. The ethyl acetate extract is washed with water, the solvent evaporated and the crystalline residue recrystallised from ethyl acetate with an addition of ligroin. The resultant pale yellow 3-phenyl-3-($\beta$-diethylaminoethyl)-2-oxo-6-thioketopiperidine of the formula

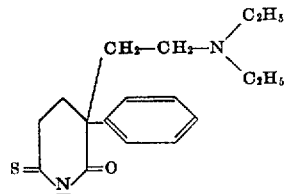

melts at 125–132° C. and forms a readily water-soluble hydrochloride.

What we claim is:

1. A member selected from the group consisting of thioketo-piperidine compounds of the formula

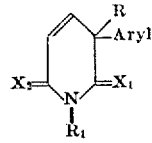

their salts and quaternary compounds, wherein one of the substituents $X_1$ and $X_2$ is sulphur and the other is a member selected from the group consisting of oxygen and sulphur, Aryl stands for a phenyl group, R stands for a member selected from the group consisting of phenyl, lower alkyl, and di-lower alkylamino-lower alkyl groups, and $R_1$ stands for a member selected from the group consisting of a hydrogen atom and a lower alkyl group.

2. A 3-phenyl-3-lower alkyl-2-oxo-6-thioketo-piperidine.
3. 3-phenyl-3-ethyl-2-oxo-6-thioketo-piperidine.
4. A 3-phenyl-3-(di-lower alkyl-amino-lower alkyl)-2-oxo-6-thioketo-piperidine.
5. 3-phenyl-3-($\beta$-diethylaminoethyl)-2-oxo-6 - thioketo-piperidine.
6. Salts of 3-phenyl-3-($\beta$-diethylaminoethyl)-2-oxo-6-thioketo-piperidine.
7. 3,3-diphenyl-2-oxo-6-thioketo-piperidine.
8. 3,3-diphenyl-2-thioketo-6-oxo-piperidine.

No references cited.